Figure 1:
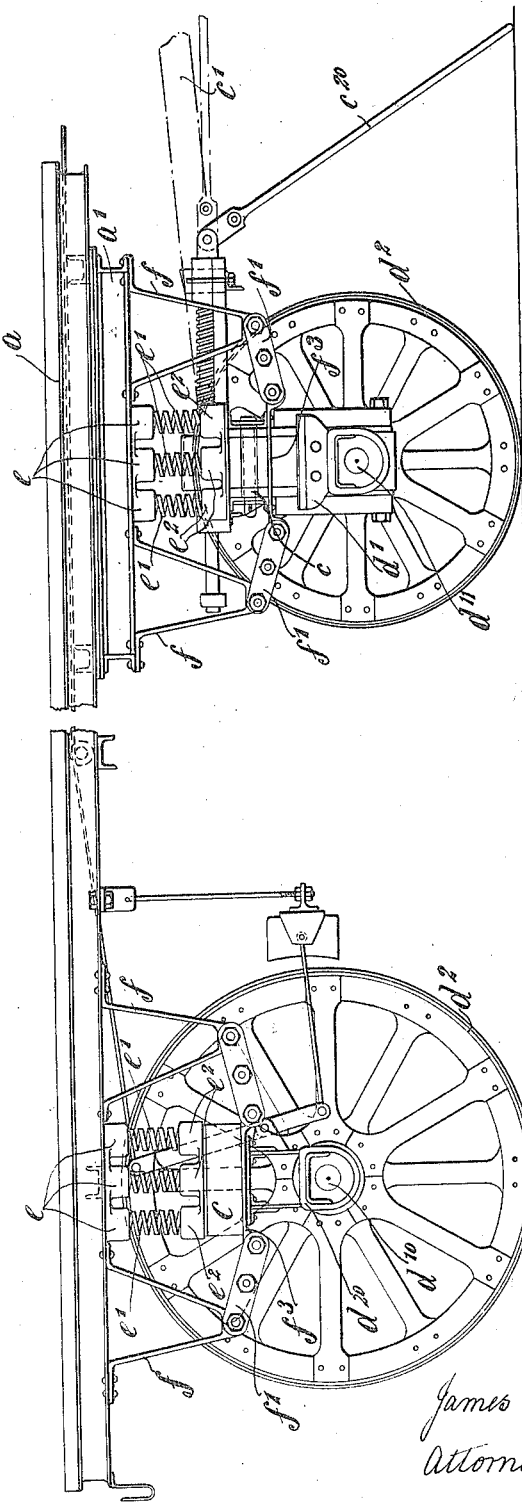

J. H. CHANDLER.
SPRING SUSPENSION FOR VEHICLES.
APPLICATION FILED MAY 29, 1922.

1,431,632.

Patented Oct. 10, 1922.

3 SHEETS—SHEET 1.

Inventor.
James Henry Chandler.
Attorney

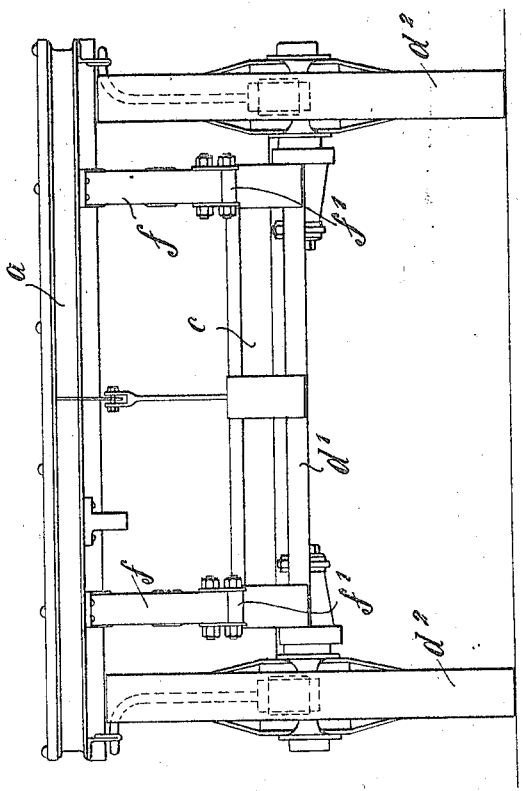

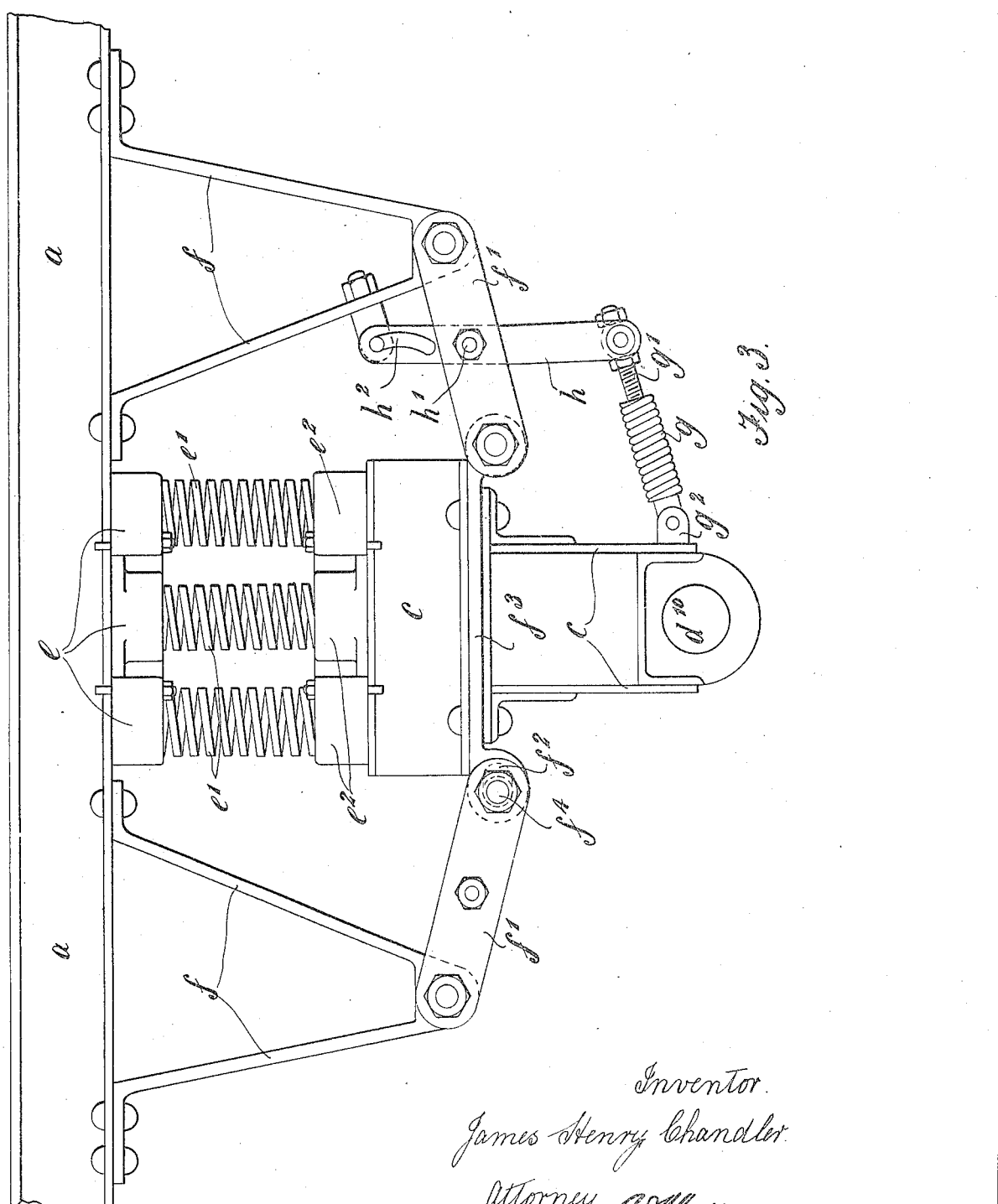

Patented Oct. 10, 1922.

1,431,632

UNITED STATES PATENT OFFICE.

JAMES HENRY CHANDLER, OF LONDON, ENGLAND.

SPRING SUSPENSION FOR VEHICLES.

Application filed May 29, 1922. Serial No. 564,614.

*To all whom it may concern:*

Be it known that I, JAMES HENRY CHANDLER, residing at London, England, a subject of the King of Great Britain and Ireland, have invented certain new and useful Improvements in Spring Suspensions for Vehicles, of which the following is a specification.

This invention relates to spring suspensions for vehicles of the general class in which there is provided at each side between relatively movable parts of the vehicle such as between the framing thereof and a wheel carrying member, a number of helical springs having vertical axes adapted to absorb vertical shocks, and in which there may be provided in addition between said vehicle parts bracket and link connections a purpose of which is to permit vertical adjustment of the springs.

The present invention comprises an improved and simplified construction or arrangement of such a spring suspension in which there is provided at each side a number of freely mounted helical springs located closely together side by side and each having its opposite ends loosely housed in cups or boxes carried by the vehicle framing or equivalent and an axle carrying member respectively, and said vehicle parts being interconnected by rigid brackets connected to the framing and pivoted links connecting the free ends of said brackets with the axle carrying member.

With such a construction both vertical and horizontal shocks are absorbed, and when the wheels encounter obstructions the suspension device will deviate from the vertical whereby certain of the springs will be compressed more than others, allowing the centre of the wheel axle to shift in the longitudinal direction of the vehicle to provide what may be termed a "flexible centre" between different axles of a vehicle.

In addition the provision of the bracket and link connections referred to permits the vehicle axles to be maintained in parallel relation.

The invention further comprises compensating means adapted to ensure that the suspension device shall under all conditions return to its proper vertical or normal position after absorption of shock.

An embodiment of the invention is illustrated in the accompanying drawings in which Fig. 1 is a side elevation of a vehicle chassis provided with the improved suspension.

Fig. 2 is a rear end elevation thereof and Fig. 3 is a side elevation on an enlarged scale showing the compensating means applied to the spring suspension.

The spring suspension comprises a box or series of cups $e$ shown at the left hand side of Fig. 1 as attached directly to the main frame $a$ of the vehicle, and at the right hand of Fig. 1 as attached to a forecarriage turning frame $a^1$. The said series of cups receives the upper ends of a corresponding number of helical springs $e^1$, the lower ends of which are received by or housed in similar cups $e^2$ shown as carried by a frame member $c$ to which the axle bearing $d^1$ or tree $d^{20}$, respectively, or equivalent, is attached. $d^2$ designates the wheels of the vehicle.

Relative movements to absorb vertical and horizontal shocks are thus permitted between the frame $a$ or turning frame $a^1$ and the parts $d^1$ or $d^{20}$ respectively, and consequently between the axle $d^{10}$ or $d^{11}$ and said chassis parts $a$ or $a^1$. The frame member $c$ and consequently the whole suspension device are suspended from the main frame $a$ or from the turning frame $a^1$ as the case may be, by means of brackets $f$, rigidly secured at their upper ends to the main frame $a$ or turning frame $a^1$ and having pivoted to their lower ends the outer ends of links $f^1$, the opposite or inner ends of which are pivoted to a plate $f^3$ forming part of the frame member $c$. By such construction the boxes or cups $e$ and $e^2$ at one side of the vertical centre of the suspension device can deviate from the horizontal in an upward direction, thus compressing certain of the springs $e^1$ more than others and allowing the centre of the axle $d^{10}$ or $d^{11}$ to shift in the longitudinal direction of the vehicle and provide what may be termed a "flexible centre" between the fore axle $d^{11}$ and the rear axle $d^{10}$ of the vehicle, which is very desirable in certain kinds of vehicles.

It may occur in practice that the spring or springs at the rear side of the suspension, which are subjected to greater compression than the others in absorbing shocks under running conditions, will tend in time to lose to some extent their rebounding qualities, resulting in the suspension device remaining permanently somewhat out of the vertical even when shocks have been absorbed and obstructions passed, and to provide against such a contingency according to the present invention I employ an improved compensating device to ensure under all conditions that the said device will return to its proper vertical or normal position after absorption of shock. This compensating device is illustrated in Fig. 3 of the drawings and comprises an auxiliary coiled spring $g$ carried by a threaded rod $g^1$ pivoted at one end to a lug $g^2$ on the lower end of the frame member $c$, and having its other end adjustably and pivotally connected to a lever or link $h$ fulcrumed at $h^1$ on the suspension link $f^1$ and having a pin and slot connection $h^2$ with the bracket $f$.

From this construction it will be apparent, on any deviation of the suspension device from its vertical centre due to compression of certain of the springs $e^1$ more than others in absorbing shocks, that the auxiliary spring $g$ acting through the links $h$ and $f^1$ will exert what may be regarded as a parallelogrammic movement tending to lower the adjacent side of the frame member $c$ and permit the corresponding springs to return to normal expanded position.

The compensating device is shown as applied to one side only of the suspension, this in practice being usually the side corresponding to the rear of the vehicle as greater compression of the springs is usually experienced at this side, but it is obvious that the device may be applied to both sides if desired.

To now refer particularly to Fig. 3, that figure also shows a sliding connection between a link $f^1$ and the frame member $c$ at that side of the suspension which is at the front under normal running conditions, this connection being produced by slotting as at $f^2$ the end of the plate $f^3$ in order that the pivot bolt $f^4$ of the link may have play in said slot and thus readily permit the deviation from the vertical of the suspension device.

What I claim as my invention as desire to secure by Letters Patent of the United States is:—

A spring suspension for vehicles, comprising a plurality of helical springs located side by side between the vehicle frame and an axle supporting member; housings on said frame and supporting member to receive the opposite ends of the springs; rigid brackets secured to the frame in front of and behind said springs; suspension links pivotally connected at their inner ends to the axle supporting member and at their outer ends to the free lower ends of said brackets; and a compensating device embodying an auxiliary spring connected at one end with said supporting member, and a vertical lever connected at its lower end with the other end of the auxiliary spring and at its upper end with the adjacent bracket, said lever being fulcrumed intermediate its ends on the suspension link associated with that bracket.

In witness whereof I have signed this specification.

JAMES HENRY CHANDLER.